US009063777B2

(12) United States Patent
Balko

(10) Patent No.: US 9,063,777 B2
(45) Date of Patent: Jun. 23, 2015

(54) CONSISTENT UNDEPLOYMENT SUPPORT AS PART OF LIFECYCLE MANAGEMENT FOR BUSINESS PROCESSES IN A CLUSTER-ENABLED BPM RUNTIME

(75) Inventor: Soeren Balko, Weinheim (DE)

(73) Assignee: SAP SE, Walldorf (DE)

( * ) Notice: Subject to any disclaimer, the term of this patent is extended or adjusted under 35 U.S.C. 154(b) by 748 days.

(21) Appl. No.: 12/644,583

(22) Filed: Dec. 22, 2009

(65) Prior Publication Data

US 2011/0154336 A1 Jun. 23, 2011

(51) Int. Cl.
  *G06F 9/46* (2006.01)
  *G06F 17/30* (2006.01)
  *G06F 9/48* (2006.01)

(52) U.S. Cl.
  CPC .............. *G06F 9/485* (2013.01); *G06F 17/30* (2013.01); *G06F 17/30356* (2013.01); *G06F 9/46* (2013.01)

(58) Field of Classification Search
  CPC ...... G06F 9/46; G06F 17/30; G06F 17/30356
  USPC ............ 718/100; 707/999.1, 999.01, 999.001
  See application file for complete search history.

(56) References Cited

U.S. PATENT DOCUMENTS

| 6,073,109 A * | 6/2000 | Flores et al. ................. 705/7.13 |
| 2004/0177358 A1 * | 9/2004 | Narayanaswamy et al. .. 719/310 |
| 2004/0181775 A1 * | 9/2004 | Anonsen et al. ............... 717/104 |
| 2005/0209993 A1 * | 9/2005 | Koehler ........................... 707/1 |
| 2005/0273787 A1 * | 12/2005 | Kovachka-Dimitrova et al. .............................. 719/310 |
| 2005/0278274 A1 * | 12/2005 | Kovachka-Dimitrova et al. ................................ 707/1 |
| 2007/0234292 A1 * | 10/2007 | Kumar et al. .................. 717/120 |
| 2009/0125366 A1 * | 5/2009 | Chakraborty et al. ............ 705/9 |

* cited by examiner

*Primary Examiner* — Jaweed A Abbaszadeh
*Assistant Examiner* — Terrell Johnson
(74) *Attorney, Agent, or Firm* — Mintz Levin Cohn Ferris Glovsky and Popeo, P.C.

(57) ABSTRACT

A system, computer-implemented method, and computer program product for undeployment of a business process definition in a cluster-enabled business process management runtime environment are presented. A BPMS server executes, through a deployment container executing one or more business processes instances of a business process definition running across a cluster of nodes, a stop operation of a running process instance of the business process application. The BPMS server further executes a remove operation of the stopped running process instance from the deployment container.

19 Claims, 3 Drawing Sheets

CONSISTENT UNDEPLOYMENT SUPPORT AS PART OF LIFECYCLE MANAGEMENT FOR BUSINESS PROCESSES IN A CLUSTER-ENABLED BPM RUNTIME

BACKGROUND

This disclosure relates generally to business process definition techniques, and more particularly to a system and method for reliably stopping and consistently removing ("undeploying") an archive containing business process definition versions.

Business process management (BPM) systems are typically implemented as part of a generic application server platform like a JEE server or an ABAP system which may support a multitude of different content types, including user interface definitions, scripting languages, coded applications, business processes, etc. The underlying application server may, again, be part of a complex, distributed system landscape, where content distribution to the nodes of that landscape is controlled by dedicated "Lifecycle Management" software. Moreover, the application server node that provides the underlying infrastructure support of a BPM system (BPMS) may itself comprise multiple physical cluster nodes, catering for better scalability and reliability of the BPMS.

Like other content types, business processes need to support different lifecycle management operations, including deploying an archive containing multiple business process definitions (specific versions thereof, respectively). Deployment is the operation of adding content to a BPMS system (i.e., making it available for execution). Other lifecycle management operations that business process need to support include starting an instance of a specific business process definition (version), stopping the process instances that relate to the process definitions contained in a particular archive, and removing (hereafter termed "undeploying") an archive containing business process definitions. Further adding complexity to this picture is the fact that business process definitions (unlike most other content types) are typically versioned to support long-running process instances. At runtime, a single process definition may concurrently exist in multiple different versions. While the BPMS runtime makes sure that new instances may only be started from a single active process definition version, which is typically the most recently deployed version, there may still be running process instances of multiple different versions of a single process definition at any point in time.

Conventional systems provide no way for reliably stopping and consistently removing ("undeploying") an archive containing business process definition versions. For example, traditional application servers (e.g., JEE servers) perform content undeployment in a much more simplistic manner. That is, content (e.g., a Java application) is simply removed from the system, regardless of any running instances of that application. As a result, the system may be left in an inconsistent state, which is often unacceptable for long-running business processes which execute mission-critical business tasks/operations. Without a way to reliably undeploy an archive, the processes' entire version histories can be affected, particularly in a cluster infrastructure where multiple process instances of a single process type may be running on different cluster nodes. Another limitation is that undeployment may not be performed if currently running process instances operate on an affected process version.

SUMMARY

This document presents a system and method providing both a stop and remove (undeployment) operation as part of a BPMS server deployment container. A "deployment container" is the execution environment for business processes on the BPMS server. Lifecycle management software initiates all process-related lifecycle operations (including the aforementioned stop and remove operations) through the BPMS server deployment container. These lifecycle management operations are each backed by a single database transaction which gathers the effects of the respective operation across all participating, affected components of the application server stack. As a result, any of these components may autonomously abort the stop or remove operation such that all previous effects can be rolled back. In other words, the transaction can be aborted and its effects up to the current point undone.

With the remove ("undeployment") feature in place, customers can remove outdated Process Composer archives, which includes process models and related artifacts, from the process server. In effect, consumption of database and main memory resources is greatly reduced, ultimately leading to an overall improvement in TCO.

The system and method described herein transparently incorporates the semantics of a versioned BPM runtime and applies both the stop and the remove functionality to a whole version history. Further, the system and method provides for a consistent system state where neither the stop nor the remove call result in non-predictable states. In particular, any affected process instances are stopped using a deterministic cancellation operation, and no process definition is removed whose instances have not yet ceased to exist i.e., were consistently terminated or aborted. Additionally, the system and method provides for transactional stop and remove functionality in a distributed or clustered environment that typically does not offer a proper distributed transaction support.

A system, computer-implemented method, and computer program product for undeployment of a business process instance in a cluster-enabled business process management runtime environment are presented. The system, computer-implemented method, and computer program product execute, by a BPMS server through a deployment container executing one or more business processes of a business process application running across a cluster of nodes, a stop operation of a running process instance of the business process application. The BPMS server further executes a remove operation of the stopped running process instance from the deployment container.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
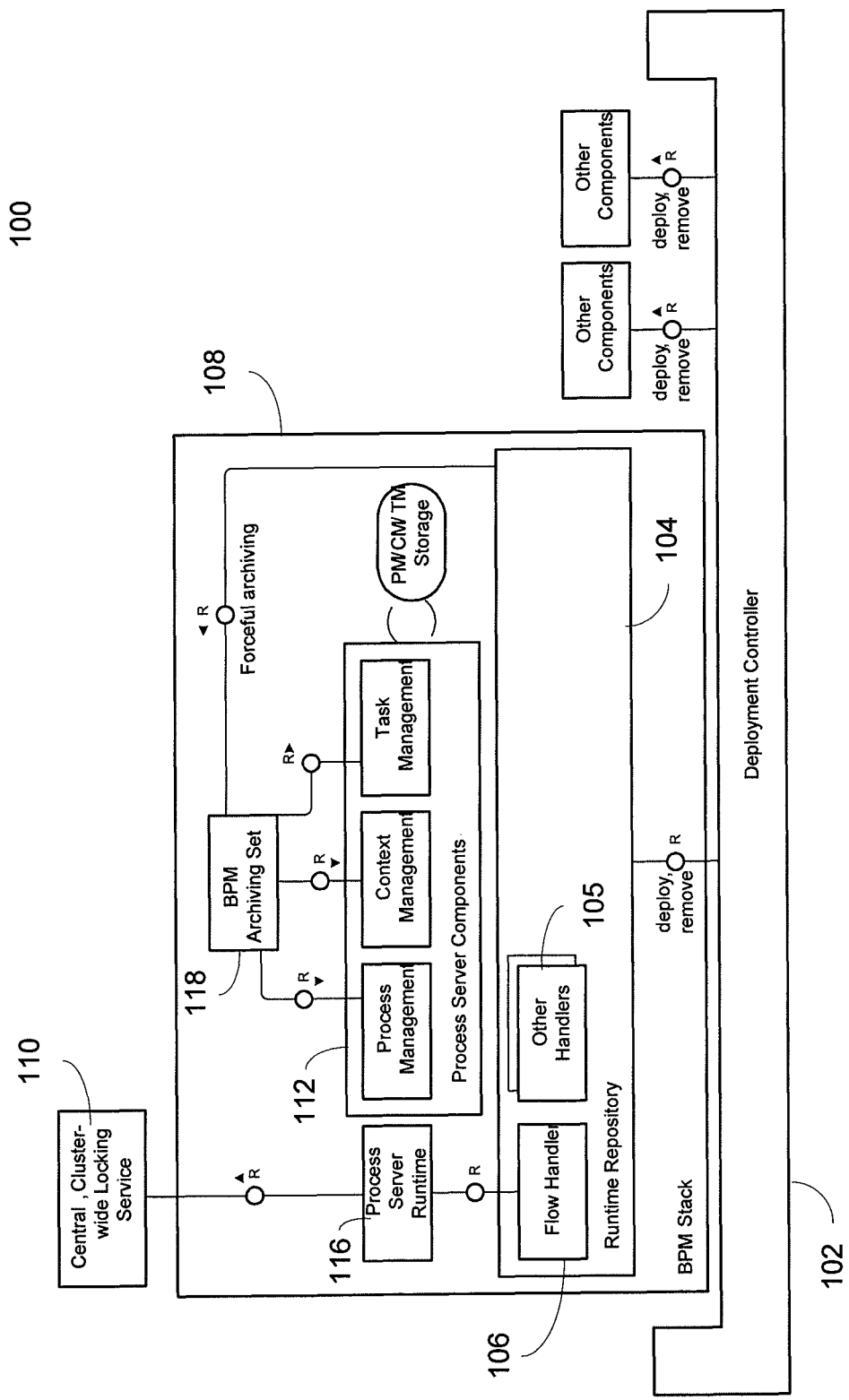
FIG. 1 illustrates a system for executing forceful undeployment ("remove"): components and interactions.

This document describes a system and method for reliably stopping and consistently removing ("undeploying") an archive containing a business process definition version. The system and method provide both a stop and remove (undeployment) operation as part of a BPMS server deployment container. Lifecycle management software initiates all process-related lifecycle operations (including these stop and remove operations) through a BPMS deployment container. These lifecycle management operations are each backed by a single database transaction which gathers the effects of the respective operation across all participating components of the application server stack. As a result, any of these components may autonomously abort the stop or remove operation such that all previous effects can be undone making use of the atomicity characteristics of transactions.

From a lifecycle management perspective, the aforementioned operations act on archives which may contain multiple content entities such as process definitions, and comprise multiple process definitions rather than single process definitions. In effect, both the stop and remove operation need to be successfully performed on all contained process definitions to complete the respective operation. In addition, a lookup mechanism fetches the entire version history of a process definition, such as a list of all versions of a process definition that were successively deployed before. In this way, both the stop and "undeployment" operations transparently clean up process instances and versions, respectively, that relate to any earlier deployed archive content. In effect, administrators do not need to manually perform tedious and error-prone lookups of process definition versions that are affected by a lifecycle management operation. The latter also supports consistent system states, which is a prerequisite for handling content transports across complex IT system landscapes (like transports from a development landscape to a productive landscape).

As a rule, a process instance is supposed to be stopped before its process definition version can be removed, because (1) process instances can only continue running if their underlying process definition or version is present on the system, and (2) that the affected process instances need to be properly cancelled, i.e., taken to a proper end state which includes archiving the final process instance state, for proper audibility purposes.

As an example, when stopping an archive A, the system initially determines the contained process definition versions (e.g., P1 [V3]; P2 [V1]; P3 [V2], . . . ), where Pi refers to a process (name) and Vj to a specific version thereof, and looks up their respective version histories (e.g., P1 [V3], P1 [V2], P1 [V1]; P2 [V1]; P3 [V2], P3 [V1]; . . . ). For each process definition version Pi [Vj], the system initially de-activates that process definition version, thus inhibiting any newly started instances of that particular version. The latter is achieved by temporarily acquiring an exclusive cluster-wide lock on the version, changing an activation flag in the shared database, and then ultimately releasing the lock. The BPMS provides for a process start mechanism that initially tries to acquire a shared cluster-wide lock on the process version identifier, looks up the activation state, and, if set to "active", launches a new instance.

After de-activating a process definition version, the system and method determine the currently running process instances from across the cluster, by looking up the respective process instance data in the underlying database that is shared between all cluster nodes and, again, making use of a distributed locking protocol. Transport of those process instances to the local node is then initiated. That is, process instances running on other cluster nodes are synchronously notified to suspend operations and persist their instance data (e.g., token positions denoting execution progress and process context variable values) on the database. Once successful, the corresponding instance data is recovered and the corresponding process instance is re-established on the local node.

Once all affected process instances from remote cluster nodes are successfully re-established on the local node, the respective instance is forcefully canceled such that the process instance reaches a definite final state. This can include performing some cancellation activities, such as notifying process collaboration partners of the forceful process' termination, archiving a final process state (i.e. for audit purposes), and cleaning up any remaining instance data both from main memory and from the database. When failing to transport process instances to the local node for cancellation, the whole stop operation is rolled back.

In order to increase the likelihood of a successful stop operation, the system and method provide for a "forceful transport" feature which unconditionally aborts a process instance's run on a remote node by externally canceling any currently running transactions of this process instance and explicitly inhibiting new transactions from being started. As a result, the process instance can immediately be transported to the local node without having to wait for an "idle" state of the process instance on the remote node (i.e., when the process instance could be "safely" transported because no actions are currently happening within the process instance).

Implementations of the system and method also provide for a remove (undeployment) feature which requires the lifecycle management software from which it was invoked to preemptively make a stop call on the respective archive. While no running process instance of any related process definition version should exist on the BPMS (including all cluster nodes) in response, the system and method provides for a consistency check that aborts and rolls back the remove transaction if a related running process instance still exists somewhere in the cluster.

The remove operation itself removes all process definition version data (like process models, data flow definitions, etc.) both from main memory and from the database such that in effect, all resources that were occupied before are freed up and are, thus, made available for newly deployed process definitions. In effect, total cost of ownership (TCO) is driven down substantially by saving crucial runtime resources (main memory and database space consumption). As process definitions comprise a multitude of different artifacts, such as BPMN-based control flow definitions, XSLT-based data mapping instructions, user interface models, etc., multiple runtime components may be affected from a remove call. The system and method transparently determines the affected runtime components by retrieving and classifying the artifacts that appear in the version history of the to-be-removed process definitions.

In a variant of the implementations described herein, an alternative remove feature can be provided, exclusively addressing de-activated process definition versions: that is, process definition versions that were de-activated before (e.g., due to deploying a new process definition version), and whose instances have ceased to exist could be safely removed from the system without having a negative impact on any running process instance. The system and method provides for an implicit removal of those process definition versions without having to be triggered by lifecycle management software. In this way, the BPMS can regularly trigger autonomous resource consumption cleanups, thus, improving the overall system performance.

Finally, the remove functionality includes an optional archiving activity where associated process instance data that was recorded in a process log is automatically archived. That includes storing the affected data in a separate persistency, such as in a regular file on a file system or on a tape storage, for example, and removing this data from the process log. In effect, the process log is cleansed of recorded process instance data whose associated process definition versions are removed. The latter is crucial to avoid memory leaks in the operational storage, such as process log database tables.

FIG. 1 depicts a system 100 for executing an undeployment operation as part of a BPMS server deployment container. The system 100 is shown in a default "rejectable undeployment" case. An undeployment or remove request coming in from the engine's deployment controller, whose purpose is the act as the central interface for lifecycle management operations such as deployment and undeployment, triggers a "remove" call in a runtime process repository 104 of a BPM stack 108. As a result, the runtime repository 104 needs to determine the affected artifacts of the to-be-removed archive. That is, the runtime repository 104 initially fetches the entire list of artifact versions from its internal persistence. That includes any artifact (and all of its versions) that was ever included in some earlier deployment of this archive. The runtime repository 104 will then dispatch undeployment calls for these artifacts to the respective runtime repository handlers 105 such as a flow handler 106.

Figure 2:
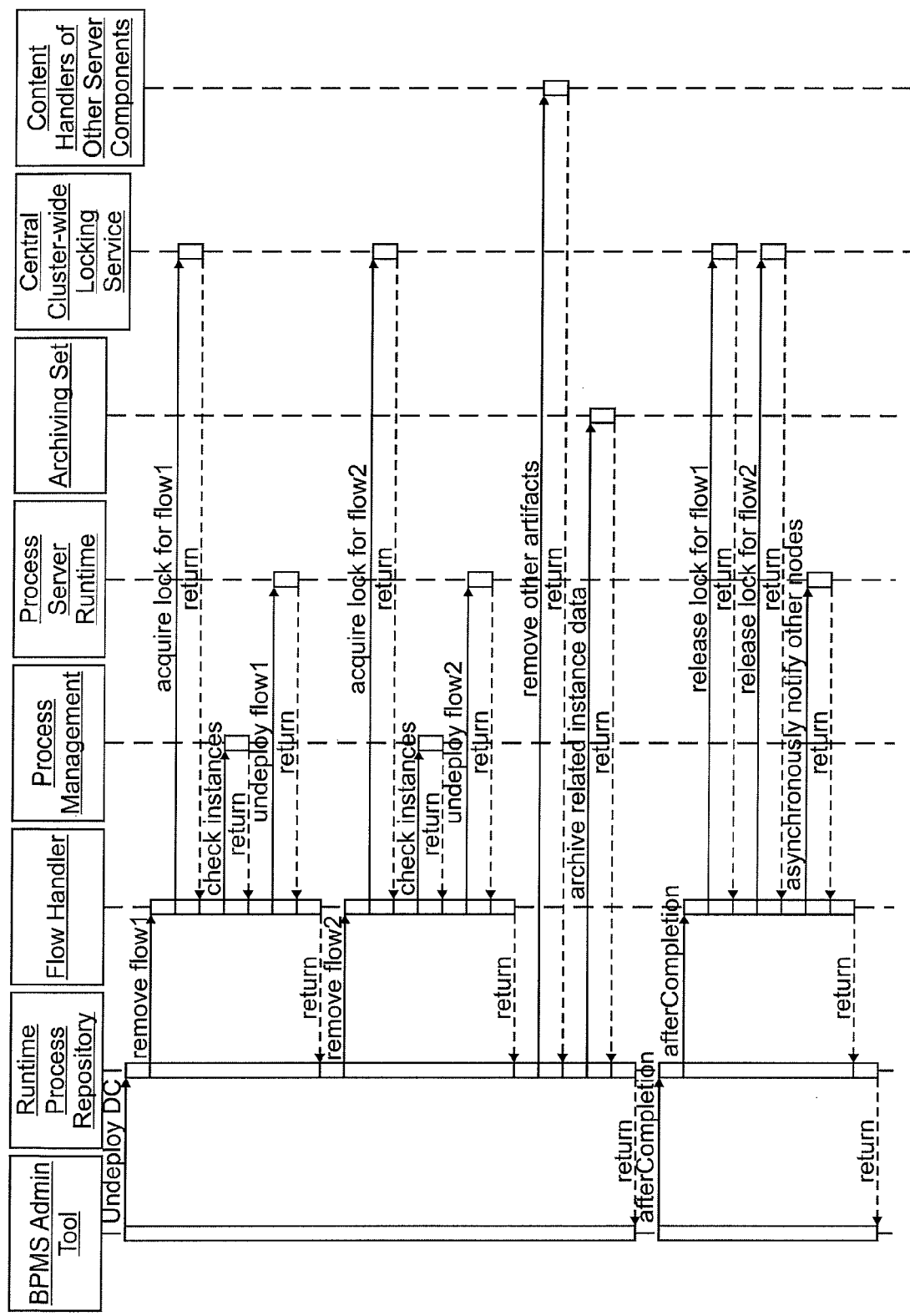
FIG. 2 shows a rejectable undeployment call sequence.

With reference also to FIG. 2, which illustrates a high-level call sequence between the affected runtime components for a flow handler case, any handler 105 which receives a rejectable undeployment request for a particular artifact version needs to first check for running instances of this artifact in the whole BMPS server cluster. To do so, distributed locks acquired from a central, cluster-wide locking service 110 are used to safeguard database access to retrieve running instances. That is, the lock avoids new instances of the affected artifact versions to be started. Notifying other cluster nodes can happen asynchronously (i.e., outside of the transaction) which is due to: (1) once the process definition is removed from the process runtime repository, no new instances can be started anywhere in the cluster; and (2) it is ensured that no instance of an affected process definition version exists somewhere in the cluster (i.e., including other nodes than the local node where the check is performed).

As most runtime process repository handlers manage "passive" artifacts which are used in an exclusively synchronous and short-running way (e.g., data mappings, data types, texts, etc.) those handlers may refrain from performing a cluster-wide search for living instances of the respective artifact. In contrast, the flow handler 106 ensures that no process instance of a to-be-undeployed process definition version exists anywhere in the cluster, and that no new process instance is spawned during the course of undeploying the respective process definition version.

The flow handler 106 fetches a lock on the process definition version identifier which blocks off creating and completing/canceling corresponding process instances in process management 112, which needs to hold central, cluster-wide locking service locks on the process definition version identifier when a process' creation or completion is persisted.

If the flow handler 106 has successfully acquired the central, cluster-wide locking service 110 lock, it may proceed to retrieve running instances from the database. Alternatively, the flow handler 106 may also make use of a process server runtime 114 process instance persistence to check for running process instances. If either the central, cluster-wide locking service lock could not be granted or running process instances exist, the flow handler 106 needs to wait for a finite duration or let the entire undeployment transaction roll back, respectively. Otherwise, the flow handler 106 initiates removal of the process definition version from the kernel 116.

Once all artifact versions are removed by their respective handlers, the runtime process repository 104 triggers an archiving component 118 to archive instance data of all completed process instances (and related data) whose process type is contained in the archive version history. For that purpose, the archiving component 118 needs to provide an API, accepting a list of process definition versions. It also needs to make the archives self-contained such that no dependencies on any to-be-undeployed artifacts exist in the archives.

In the transaction's "afterCompletion" callback, the individual handlers may then release their central, cluster-wide locking service locks and asynchronously notify the other cluster nodes to remove the corresponding content from their main memory (if successfully committed, only).

While the rejectable undeployment call natively operates on whole deployment archives, other granularities are easily conceivable. That includes (1) a specific process definition (including all of its versions), (2) all inactive versions of a specific process definition, and (3) a single process version.

The BPMS server's deployment controller interacts with the deployment container (runtime repository 106) by issuing a remove call which translates to a forceful undeployment of a whole archive. The forceful undeployment call incorporates all of the functionality that is covered by rejectable undeployment call. In addition to that, the forceful undeployment call aborts possibly running process instances before performing the actual undeployment. In detail, it makes sure that no running processes for the affected archive exist somewhere in the cluster. In effect, all process instances must be cancelled, and thus, completed in a deterministic fashion, which includes archiving the residuals of the cancelled processes.

Figure 3:
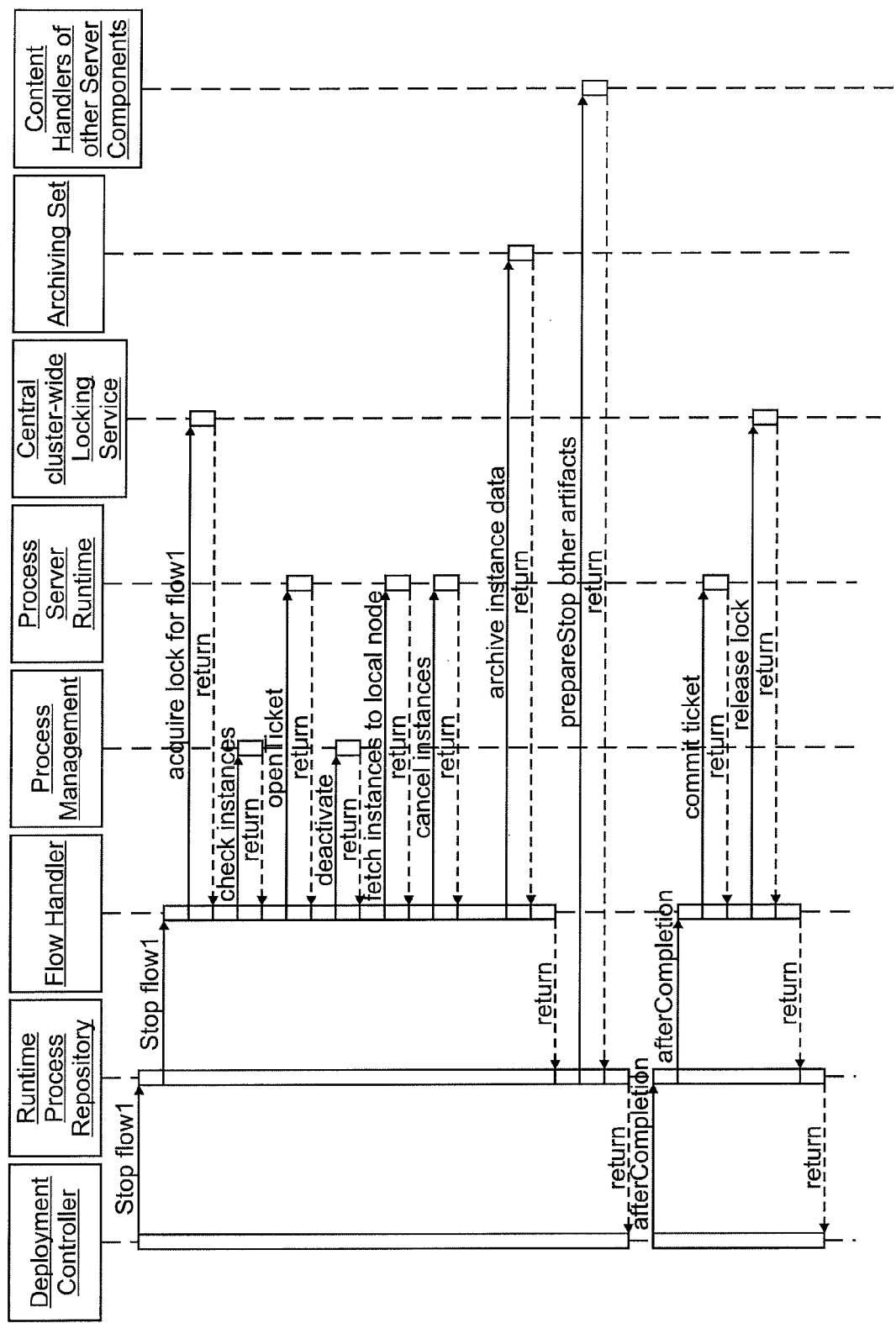
FIG. 3 shows a forceful "undeployment" call sequence.

FIG. 3 illustrates the principal stages of the corresponding call sequence between the deployment controller and the various components in the BPMS stack 108. Similar to the rejectable undeployment case, forcefully undeploying an archive must behave transactionally, i.e. the runtime repository 104 is free to roll back the undeployment request at any time (due to technical failures). The BPMS stack 108 will (internally) introduce various measures to reduce the likelihood for failures in this context.

The idea of aborting processes is to first determine all running instances which is again, safeguarded by a central, cluster-wide locking service lock. The affected process instances may actually reside anywhere in the cluster, that is, on any computer "node" that is part of the cluster. To reliably cancel the process instances (i.e., within the remove transaction), those process instances must initially be transported to the local node (i.e., the cluster node where the remove call was issued). Transporting a process instance from a remote cluster node to the local node entails (1) persisting the process instance data to the shared database, then (2) evicting the process instance data from main memory of the remote node and (3) loading the process instance data from the database back into main memory of the local node. The established algorithm may optionally be complemented by a "forceful eviction" feature which transports a remote process instance even if there are "ready" transactions for this group even if that process instance is currently busy running transactions which need to be explicitly aborted and later re-started on the local node.

In order to not deplete main memory on the local node, the arriving process instances may be handled in a sequential fashion where a process instance (upon arrival) is immediately cancelled, using a process management 112 API call. Once all process instances are successfully cancelled, their residuals are archived.

The system and method can be used for: (1) improving resource utilization (main memory and database disk space) by offering a functionality to stop and remove obsolete process definitions; (2) improving development roundtrips in a BPMS runtime, where outdated process definitions can be removed from the system; and (3) integrating a BPMS runtime server into a lifecycle management system which globally handles landscape transports and content lifecycle. The latter requires a participating server system to automatically handle deployment and undeployment requests issued by the lifecycle management system.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computer-implemented method comprising:
executing, by a business process management system (BPMS) server through a deployment container executing one or more business processes of a business process application running across a cluster of nodes, a stop operation of a running process instance of the business process application, the running-process instance being stopped on each node that previously executed the running process instance, the running-process instance being stopped by locking at least one process flow associated with the running process instance on associated nodes of the cluster of nodes, the execution of the stop operation comprising using a distributed locking protocol to look UP respective process instance data in a database shared by the cluster of nodes, the execution of the stop operation further comprising initiating transport of the running process instance to a local node of the cluster of nodes; and
executing, by the BPMS server, a remove operation of the stopped running process instance from the deployment container,
wherein each of the stop operation and the remove operation are supported by a single database transaction that gathers effects of the stop operation and the remove operation on a plurality of components of each node of the cluster of nodes, each of the plurality of components configured to autonomously abort the stop operation and the remove operation, the effects of the stop operation and the remove operation being rolled back when the stop operation and the remove operation are aborted.

2. The computer-implemented method in accordance with claim 1, wherein the a database stores one or more process instance definitions that includes a process instance definition of the running process instance.

3. The computer-implemented method in accordance with claim 1, wherein the gathering is performed in a single database transaction performed on the database and by the BPMS server, and wherein the effects are gathered across all participating components of the plurality of components.

4. The computer-implemented method in accordance with claim 2, wherein executing the stop operation further includes:
deactivating a process instance definition version of a process instance definition associated with the running process instance; and
determining the currently running process instance from across the cluster of nodes.

5. The computer-implemented method in accordance with claim 4, wherein the deactivating of the process instance definition version of the process instance definition associated with the running process instance to be stopped includes: the looking up of the respective process instance data in the database and the initiating of the transport of the running process instance to the local node of the cluster of nodes.

6. The computer-implemented method in accordance with claim 5, further comprising:
synchronously notifying process instances running on other nodes of the cluster of nodes to suspend operations and persist their instance data on the database.

7. The computer-implemented method in accordance with claim 6, further comprising:
recovering instance data corresponding to the running process instance to be stopped;
reestablishing the corresponding running process instance on the local node; and
forcefully canceling the running process instance reestablished on the local node such that the running process instance reaches a definite final state.

8. The computer-implemented method in accordance with claim 2, wherein the remove operation of the stopped running process instance removes all process definition version data associated with the stopped running process instance from a main memory of the BPMS server and from the database.

9. The computer-implemented method in accordance with claim 8, further comprising storing the removed process definition version data in an archive that is separate from the database.

10. The computer-implemented method in accordance with claim 9, further comprising archiving a process log of the stop and remove operations.

11. A computer program product comprising a non-transitory machine-readable storage medium readable by at least one processor and storing instructions for execution by the at least one processor for:
executing, through a deployment container executing one or more business processes of a business process application running across a cluster of nodes, a stop operation of a running process instance of the business process application, the stop operation stopping the running-process instance on each node that previously executed the running process instance, the running-process instance being stopped using a cluster-wide lock that prevents a modification of the running process instance, the cluster of nodes sharing a database that stores one or more process instance definitions that includes a process instance definition of the running process;
looking up respective process instance data in the database that is shared by the cluster of nodes, using a distributed locking protocol; and
initiating transport of the running process instance to a local node of the cluster of nodes; and
executing a remove operation of the stopped running process instance from the deployment container,
wherein each of the stop operation and the remove operation are supported by a single database transaction that gathers effects of the stop operation and the remove operation on a plurality of components of each node of the cluster of nodes, each of the plurality of components configured to autonomously abort the stop operation and the remove operation, the effects of the stop operation and the remove operation being rolled back when the stop operation and the remove operation are aborted.

12. The computer program product in accordance with claim 11, wherein the gathering is performed in one database transaction, and wherein the effects are gathered across the plurality of components.

13. The computer program product in accordance with claim 11, wherein the instructions for execution by the at least one processor further include instructions for:
deactivating a process instance definition version of a process instance definition associated with the running process instance; and determining the currently running process instance from across the cluster of nodes.

14. The computer program product in accordance with claim 11, wherein the instructions for execution by the at least one processor further include instructions for:
   synchronously notifying process instances running on other nodes of the cluster of nodes to suspend operations and persist their instance data on the database.

15. The computer program product in accordance with claim 14, wherein the instructions for execution by the at least one processor further include instructions for:
   recovering instance data corresponding to the running process instance to be stopped;
   reestablishing the corresponding running process instance on the local node; and
   forcefully canceling the running process instance such that the running process instance reaches a definite final state.

16. The computer program product in accordance with claim 11, wherein the instructions for execution by the at least one processor further include instructions for:
   removing all process definition version data both from main memory of the storage medium and from the database.

17. A system comprising:
   a deployment container executing one or more business processes of a business process application running across a cluster of nodes; and
   a business process management system (BPMS) server computer that provides the business process application to the deployment container, the BPMS server computer executing a stop operation of a running process instance of the business process application, and executing a remove operation of the stopped running process instance from the deployment container, the execution of the stop operation comprising using a distributed locking protocol to look up respective process instance data in a database shared by the cluster of nodes, the execution of the stop operation further comprising initiating transport of the running process instance to a local node of the cluster of nodes,
   wherein the running-process instance is stopped on each node by using a cluster-wide lock that prevents a modification of the running process instance,
   wherein each of the stop operation and the remove operation are supported by a single database transaction that gathers effects of the stop operation and the remove operation on one or more components of each node of the cluster of nodes, each of the one or more components configured to autonomously abort the stop operation and the remove operation, the effects of the stop operation and the remove operation being rolled back when the stop operation and the remove operation are aborted.

18. The system in accordance with claim 17, wherein the database stores one or more process instance definitions that includes a process instance definition of the running process instance.

19. The system in accordance with claim 18, wherein the BPMS server computer gathers the effects in one database transaction, the effects being gathered across the one or more components of the cluster of nodes.

* * * * *